S. S. COLT.
MOLDING APPARATUS.
APPLICATION FILED JAN. 23, 1917.

1,227,041.

Patented May 22, 1917.
5 SHEETS—SHEET 1.

WITNESSES:
Fred'k K. W. Frantzel
Eva E. Desch

INVENTOR:
Samuel S. Colt,
BY
Frantzel and Richards
ATTORNEYS.

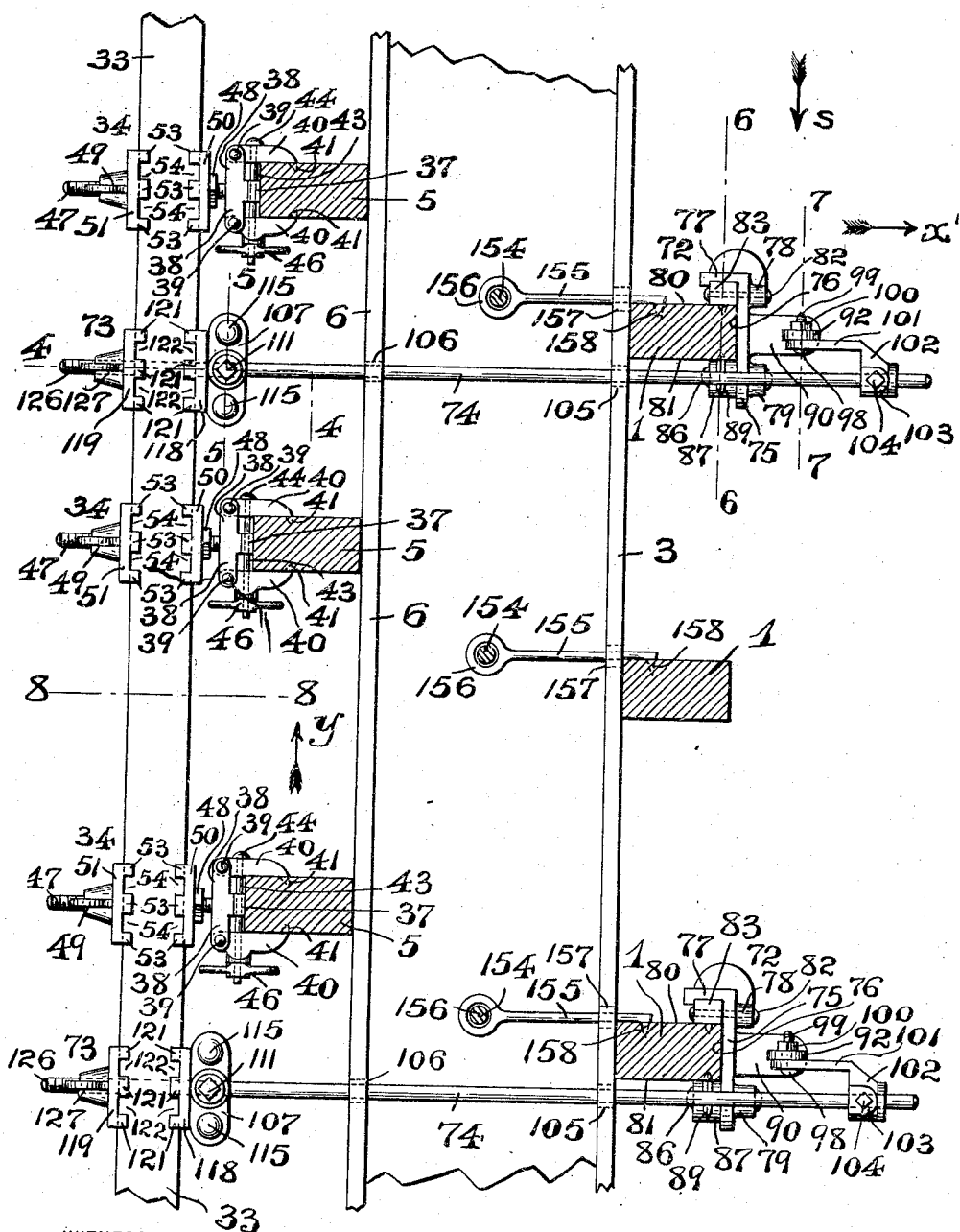

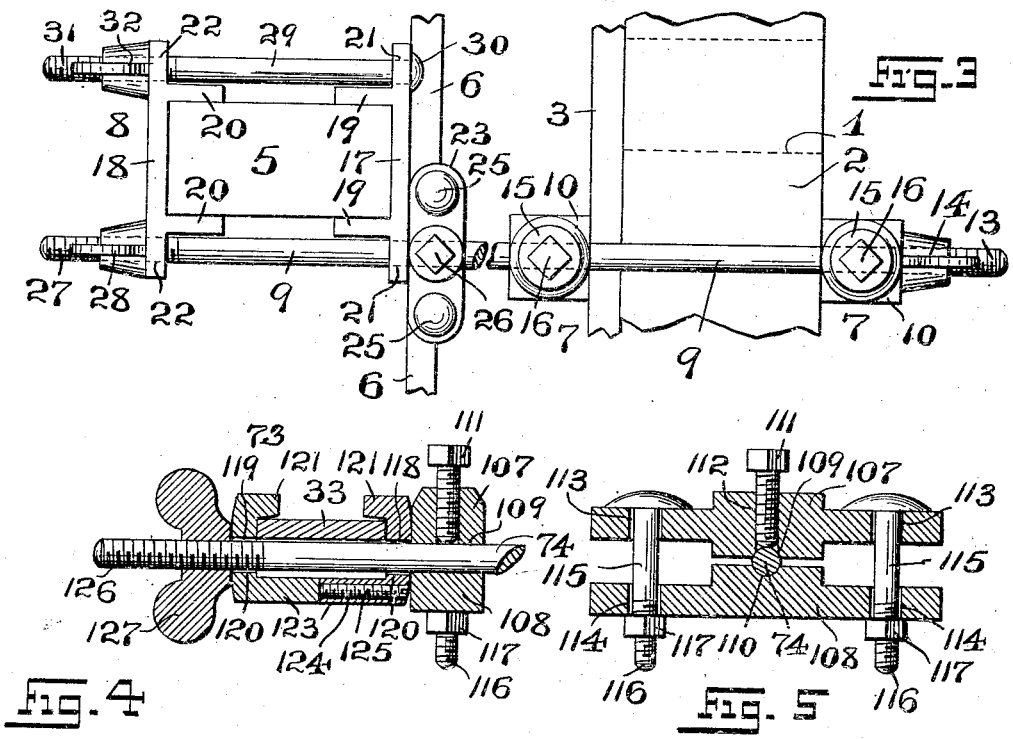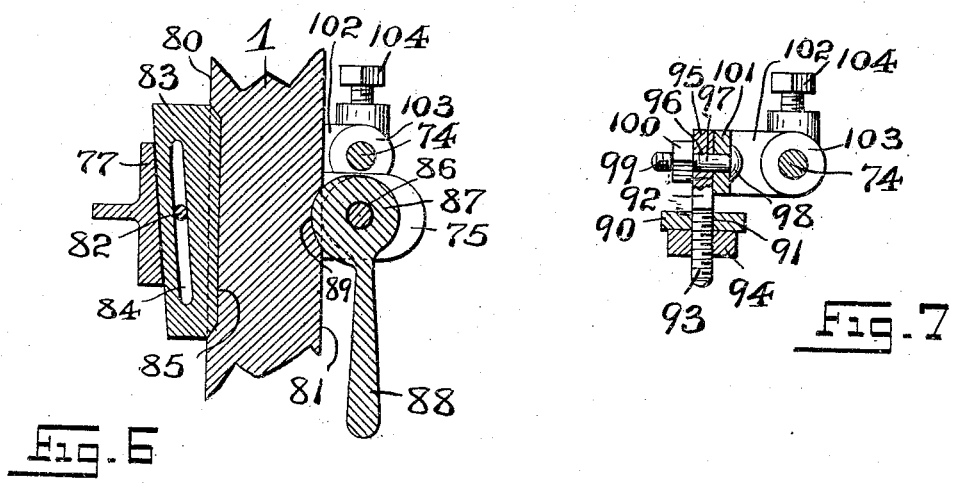

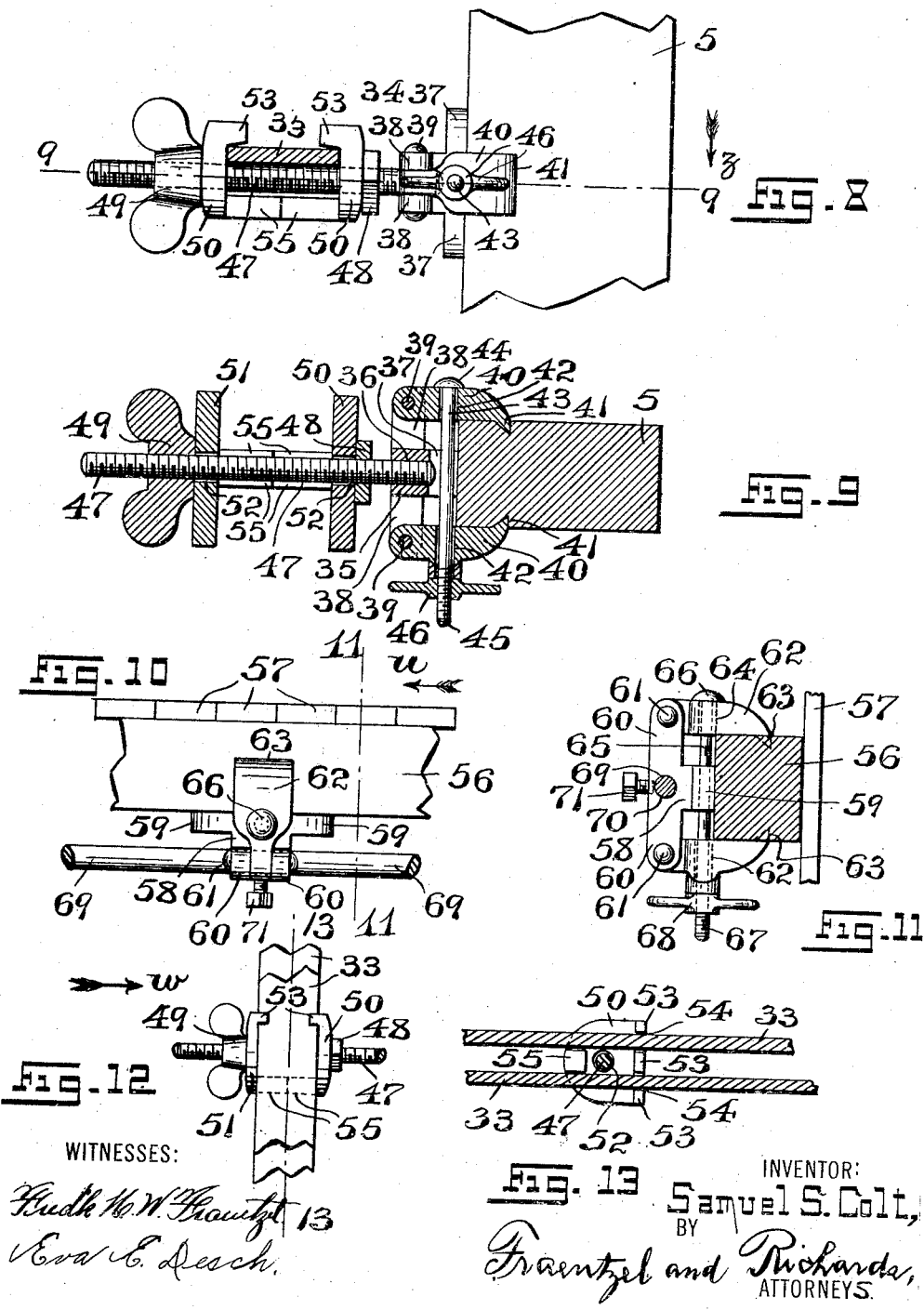

S. S. COLT.
MOLDING APPARATUS.
APPLICATION FILED JAN. 23, 1917.

1,227,041.

Patented May 22, 1917.
5 SHEETS—SHEET 5.

WITNESSES:

INVENTOR:
Samuel S. Colt,
BY
Fraentzel and Richards
ATTORNEYS.

UNITED STATES PATENT OFFICE.

SAMUEL S. COLT, OF ORANGE, NEW JERSEY.

MOLDING APPARATUS.

1,227,041.   Specification of Letters Patent.   Patented May 22, 1917.

Application filed January 23, 1917. Serial No. 143,903.

*To all whom it may concern:*

Be it known that I, SAMUEL S. COLT, a citizen of the United States, residing at Orange, in the county of Essex and State of New Jersey, have invented certain new and useful Improvements in Molding Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in concrete construction, and especially in the manner of forming or molding and in the use of concrete, or other material, which can be molded and which will set and harden, so as to be used as a substitute for stone, bricks, steel, hollow tile, etc., in the construction of veneering sheathed or covered structures, such as frame buildings, cribbings, and the like, and for all kinds of engineering and architectural structures where concrete or the like may be applicable; and, the present invention has reference, more particularly, with the use of concrete or other material adapted as a substitute for stone, bricks, steel, hollow tile, or the like, a novel form or cribbing and novel fixing devices, space-adjusting or spreading devices, and spanning members employed in conjunction therewith, all arranged and constructed to provide a novel forming means which can be easily and quickly erected, is simple in its construction and operation, and can be used many times over and over without deterioration, so as to provide an economical form or cribbing for any of the purposes stated.

The present invention, therefore, has for its principal object the production of a simple and effective device for use as a form, fixing and adjusting means, as well as suitable spanning members being used in conjunction therewith, to be employed in the production of concrete or similar veneering for sheathed buildings and other structures, but which may also be used as a cribbing in the erection of walls, buildings, and in engineering or architectural construction of concrete, or other similar material, with a view of providing a form or a cribbing which can be used at many times without deterioration or destruction after the work has been completed, and to produce, principally, a perfectly formed veneering, wall, or structure in any shape, as may be desired, of concrete, or the like.

Other objects of the present invention not at this time more particularly enumerated will be clearly understood from the following detailed description of the present invention.

With the various objects of the present invention in view, the said invention consists, primarily, in the novel form for use in producing veneering, walls, or other structures of concrete or other similar material, as hereinafter set forth; and, the invention consists, furthermore, in the novel forming or molding means, as well as in the general arrangements and combinations of the several devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Figure 1 is a transverse vertical sectional representation of the molding-form in which the veneering or wall of concrete or the like is to be formed, and a portion of which is also represented in vertical section, said view showing in connection therewith, the spanning members in cross-section, and in side elevation, certain of the coöperating fixing and adjusting devices; and Fig. 2 is a horizontal sectional representation of the said devices and parts, said section being taken on line 2—2 in said Fig. 1.

Fig. 3 is a detail plan or top view, on an enlarged scale of the fixing devices shown in connection with said Fig. 1.

Fig. 4 is a detail sectional representation taken on line 4—4 in said Fig. 2, illustrating more particularly one manner of clamping the spanning member; and Fig. 5 is a transverse vertical section, taken on line 5—5 in said Fig. 2.

Fig. 6 is a vertical cross-section, taken on line 6—6 in said Fig. 2, looking in the direction of the arrow $x'$; and Fig. 7 is a similar section, taken on line 7—7 in said Fig. 2, also looking in the direction of the arrow $x'$.

Fig. 8 is a transverse sectional representation, taken on line 8—8 in said Fig. 2, looking in the direction of the arrow *y*, showing in connection with the spanning member and in side elevation, the clamping means for adjustably connecting the spanning means with the uprights of the form; and Fig. 9 is a horizontal section, taken on line 9—9 in said Fig. 8, looking in the direction of the arrow *z*.

Figure 1:
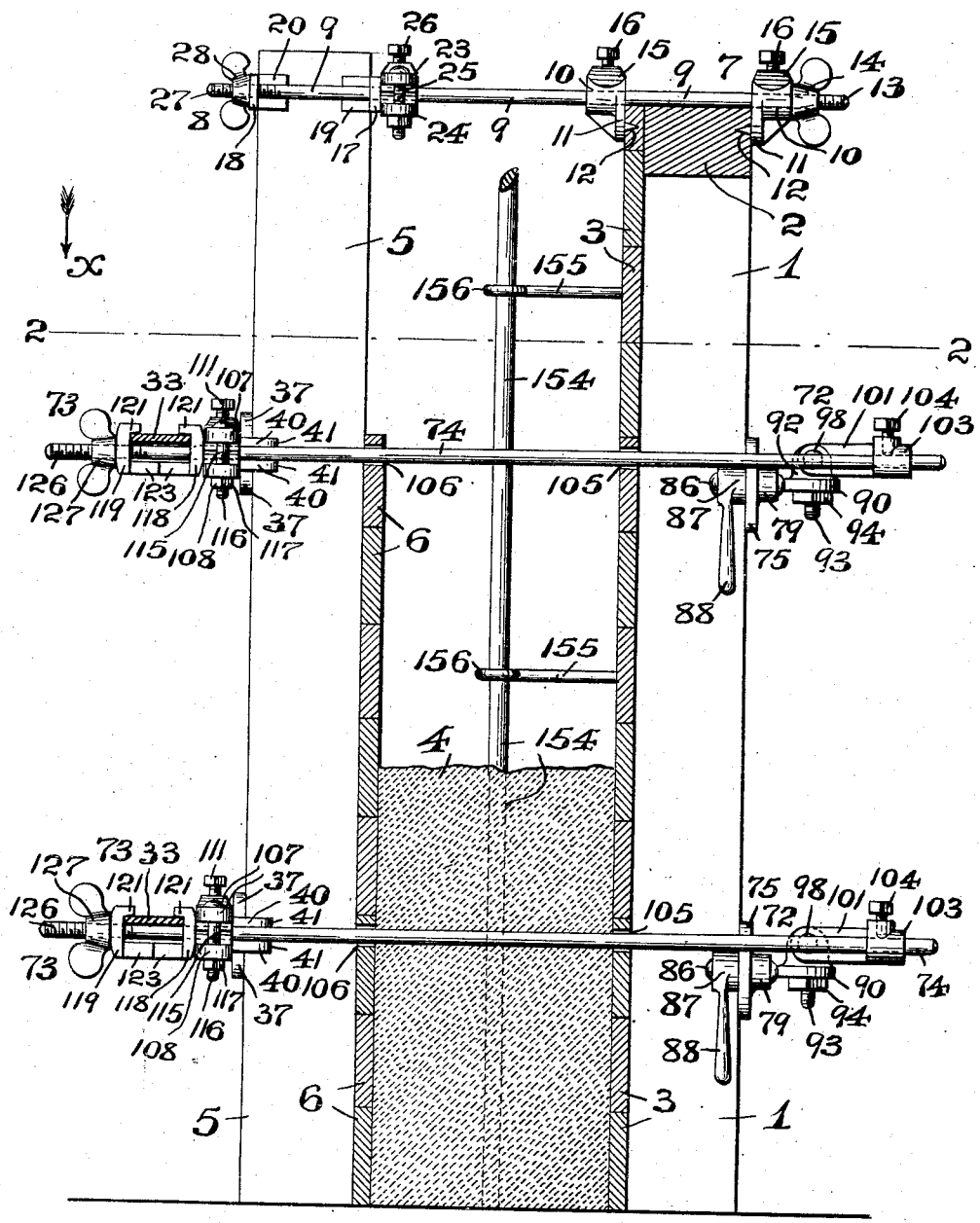

Fig. 10 is a view of a clamping and adjusting means, showing in connection therewith a portion of a spanning member or rod and the manner of connecting the said rod in its fixed relation with said clamping and adjusting means; the device being applicable to horizontally disposed cribbing members, in lieu of vertical uprights, such as are shown in Figs. 1 and 2; and Fig. 11 is a transverse section of the same, said section being taken on line 11—11 in said Fig. 10, looking in the direction of the arrow *u*.

Fig. 12 is a plan view, showing the arrangement of the spreader or space-adjuster clamps applied to a pair of spanning members or to the overlapping end-portions of two of such spanning members; and Fig. 13 is a vertical section of the said parts, said section being taken on line 13—13 in said Fig. 12, looking in the direction of the arrow *w*.

Figure 14:
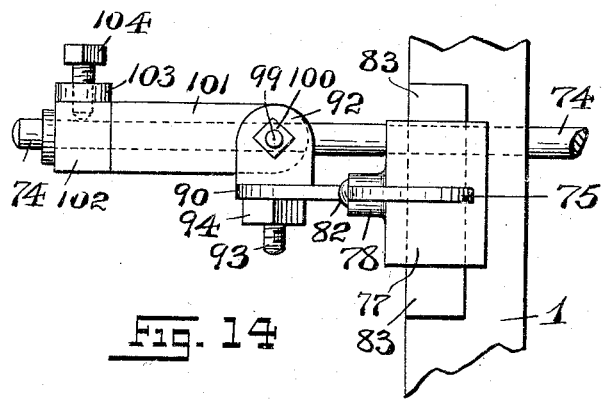

Fig. 14 is a side elevation of a portion of a stud or upright, and a side elevation of a spreader or space-adjusting means clamped in its position upon said stud or upright, said view being represented looking in the direction of the arrow *s* in Fig. 2.

Figure 15:
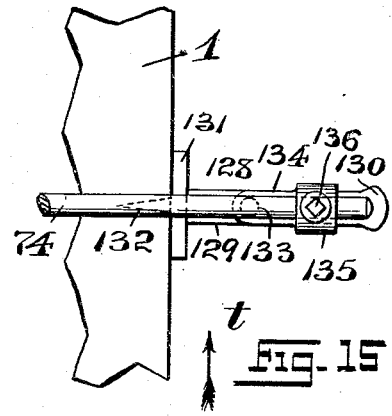
Figure 16:
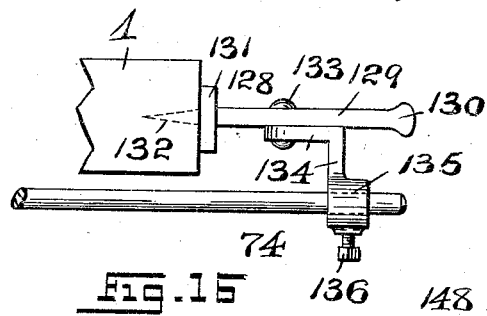

Fig. 15 is a plan or top view of a modified form of fixing device; and Fig. 16 is a view of the parts represented in said Fig. 15, looking in the direction of the arrow *t* in said Fig. 15.

Figure 17:
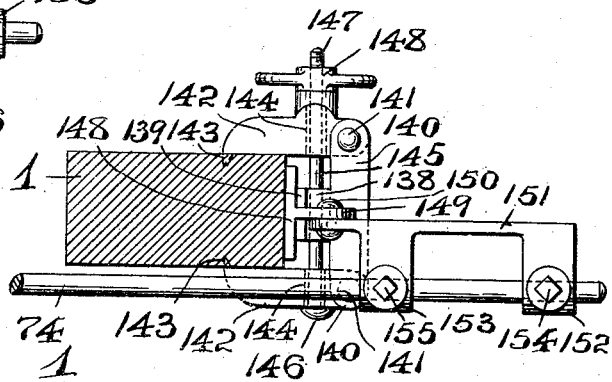
Figure 18:
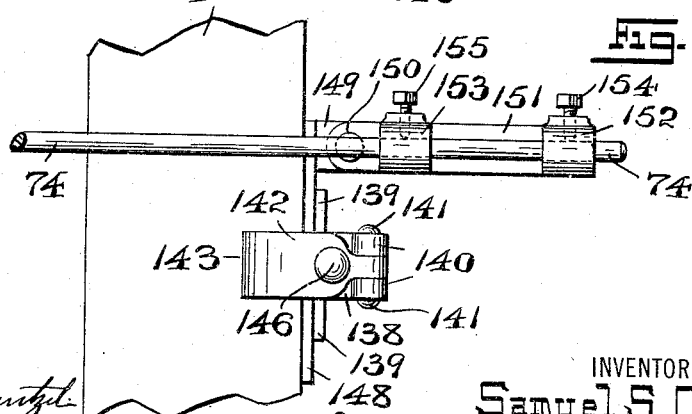

Fig. 17 is a plan or top view of another modified form of spreader or space-adjusting means, in its clamped relation upon an upright or stud, the said upright or stud being represented in horizontal section; and Fig. 18 is a side-elevation of the device and parts represented in said Fig. 17.

Similar characters of reference are employed in all of the said above described views, to indicate corresponding parts.

Referring now to the said figures of the drawings, the reference-character 1 indicates a series of retaining elements, as uprights or posts, which in the case of a building are known in the trade as "studding" carrying upon their upper end-portions a "stringer" or top-member 2, such as is commonly used in buildings, and 3 indicates the usual sheathing or covering. It will be understood, however, that the parts designated by the reference-characters 1, 2 and 3 may be the members of a cribbing when the form or mold is to be used in the production of a wall or other structure of concrete, or the like. The mass of concrete, or the like, whether in the form of a veneering, or in any other desired form, in Fig. 1 of the drawings, is designated by the reference-numeral 4. The reference-character 5 indicates a series of retaining elements, as post or uprights, preferably of wood, and known as two by fours, although they may be of other suitable cross-section, which are placed in their vertical positions, as indicated in Fig. 2 of the drawings, in vertical planes preferably intermediate of the uprights or studding 1, although it will be clearly evident, that under some circumstances the said posts or uprights may be otherwise desirably placed.

The arrangement of the said uprights or posts 5 is such that prior to the filling-in or pouring operation of the wall or veneering 4, the mold or form-boards 6 can be placed against the said posts or uprights, as indicated in Figs. 1 and 2 of the drawings.

In starting to build the veneering, wall, or structure, as 4, of concrete or other suitable material, the lower end-portions of the several posts or uprights 5 are placed so that they will rest upon the ground, or other suitable foundation, the said uprights or posts being suitably braced or otherwise secured in place so as to be substantially plumb as to their vertical alinement.

One means for thus fixing the said vertical posts or rods in the above-stated positions is illustrated in Figs. 1 and 3 of the drawings, and comprises the fixing devices 7 and 8 and tie-rod 9, shown in said figures. The said devices 7 are usually made in the form of collars or sleeves, as 10, into and through the perforated body-portions of which the one end-portion of the tie-rod 9 extends, the said collars or sleeves 10 being provided with downwardly extending flat clamping elements, as 11, adapted to be, respectively, brought into embracing engagement with the stringer or top-member 2 and the upper member of the sheathing 3, each element 11 being preferably provided with a biting tooth or teeth 12, the purpose of which is self-evident. As shown, the extending end-portion of the tie-rod 9 is preferably provided with a screw-threaded portion 13 upon which is mounted a suitable adjusting nut, as 14. To secure the said fixing devices 7 in their clamped relation, respectively, upon the outer faces of the parts or members 2 and 3, the said collars or sleeves 10 are provided with internally screw-threaded portions, as 15, in which are disposed the screw-threaded shanks of set-screws 16, the free end-portions of which are adapted to be brought into positive binding and holding relation with the said tie-rod 9.

Each fixing device 8 comprises a pair of plate-like elements, as 17 and 18, the element 17 being formed upon one side with post-embracing members or ribs 19 and the other element 18 being similarly formed upon one of its sides with post-embracing members or ribs 20, arranged so as to be brought into embracing relation with the post 5, in the manner illustrated in said Fig. 3 of the drawings. The said plate-like elements 17 and 18 are respectively perforated, as at 21 and 22, through one set of perforations the previously-mentioned rod 9 extends and is secured in place by means of a pair of clamping plates 23 and 24 connected by the adjusting bolts or screws 25 and secured upon the tie-rod 9 by a set-screw 26. Upon the screw-threaded end-portion 27 of the said rod 9 which extends beyond the member 18, is a tightening nut 28 of any suitable construction. Mounted in the other set of holes or perforations 21 and 22 of the said plate-like elements 17 and 18 is a tightening bolt, as 29, formed with a head 30 upon one end which bears upon the plate-like element 17, and which has its other screw-threaded end-portion 31 extending beyond the plate-like element 18 and has mounted thereon a tightening nut 32 of any suitable construction.

The manner of securing the said devices 7 and 8 in their clamping positions upon the members 2 and 5, and the manner of proper adjustment, for fixing each vertical post or upright 5 in its plumb and substantially properly spaced relation to the studs 1 and sheathing 2 will be fully understood from an inspection of said Figs. 1 and 3 of the drawings.

Lateral bracing, as well as further plumbing the portions of the vertical posts or uprights 5 is produced by suitably formed spanning members 33, preferably long metal plate-like pieces, and suitable retaining or securing clamps, generally designated by the reference-character 34, and as indicated more particularly in Figs. 2, 8 and 9 of the drawings. Each retaining or securing clamp comprises a body-portion 35 having a screw-threaded hole 36 and a pair of bearing-members 37 which are adapted to be placed against the outer face-portions of the vertical posts or upright 5. The body-portion 35 is further provided with oppositely extending perforated ears or lugs, as 38, said ears or lugs being arranged in pairs, and each pair of perforated ears or lugs having a pivot-pin 39 which extends across the space between each pair of ears or lugs 38. Pivotally mounted upon each pivot-pin 39, in the space between each pair of said ears or lugs 38, is a clamping member, as 40. Each clamping member 40 is formed with a biting jaw 41 and a perforation or hole 42. Mounted in the said holes or perforations 42 and extending laterally across the space between the said clamping members 40 and also between the said bearing-members 37 is a tightening bolt, as 43, formed at one end with a head 44 which bears upon the outer face of the one clamping member 40, and at its other end-portion has a screw-thread, as at 45, for the reception thereon of a suitably formed tightening means, nut, or the like, as 46, and by means of which the biting jaws 41, as well as the members 40, can be brought into positively clamped relation with the vertical post or upright 5, as will be clearly understood. Suitably screwed into the screw-threaded hole or perforation 36 of the body-portion 35, or otherwise suitably connected therewith, is a screw-threaded rod, as 47, said rod having mounted thereon a pair of adjustable lock-nuts, as 48 and 49. The reference-characters 50 and 51 indicate a pair of clamping elements or plates, formed with holes or perforations 52 for mounting said elements or plates upon the rod 47, said plates being provided at their upper edge-portions with retaining lugs or projections 53 and the intervening spaces 54, and at their lower edge-portions the said elements or plates 50 and 51 are provided with the abutting lugs or projections 55. As shown in the several figures of the drawings, the said embracing elements or plates 50 and 51 are arranged against the opposite edge-portions of the said spanning members 33 with the lugs or projections 53 above said members 33 and the lugs or projections 55 extending beneath the said members 33. After proper adjustment of the nut 48, the nut 49 is tightened, so as to bring the clamping and embracing elements or plates 50 and 51 into their positively clamped relation with the spanning member 33, the secured and clamped relation of the said various devices and parts thus retaining the said vertical posts or uprights in their proper positions perfectly plumb and against lateral movement, as will be clearly evident. Of course it will be understood, that on account of the length of the form in which the veneering or wall of concrete is to be formed, it may be necessary to overlap the end-portions of the next-adjacent spanning members 33, or, as may be desirable in some cases to employ the spanning members in pairs, as indicated in Figs. 12 and 13 of the drawings, the same retaining or securing clamps 34 with the same clamping elements or plates 50 and 51 may be used, except that the said clamping elements or plates 50 and 51 are given a quarter turn upon the rod 47, which permits of the opposite edge-portions of the members 33 to be arranged in the spaces 54 between the lugs or projections 53, with the abutting lugs or projections 55 disposed between the overlapping edge-portions of the said spanning members 33, as shown in Fig. 13.

It may also happen, in some instances, that instead of the vertical post or uprights 5 and the horizontal mold or form-boards 6, it may be necessary to use horizontally disposed beams 56 and vertically disposed mold or form-board 57, as indicated in Figs. 10 and 11 of the drawings.

In that case, I use the retaining or securing clamps illustrated in said Figs. 10 and 11, each clamp comprising a body-portion 58 provided with a pair of bearing-members 59 which are adapted to be placed against the outer face-portion of the horizontally disposed beam 56. The said body-portion 58 is also provided with oppositely extending perforated ears or lugs, as 60, said ears or lugs being arranged in pairs, and each pair of perforated ears or lugs having a pivot-pin 61 which extends across the space between each pair of said ears or lugs. Pivotally mounted upon each pivot-pin 61, in the space between each pair of said ears or lugs, is a clamping member, as 62, each clamping member being formed with a biting jaw 63 and a perforation or hole 64. Mounted in the said holes or perforations 64 and extending laterally across the space between the said clamping members 62 and also between the bearing-members 59 is a tightening bolt, as 65, formed at one end with a head 66 which bears upon the outer face of the one clamping member 62, and at its other end has a screw-thread, as 67, for the reception thereon of a suitably formed tightening means, nut, or the like, as 68, and by means of which the biting jaws 63, as well as the members 62, can be brought into positively clamped relation with the horizontally disposed beams 56, as will be clearly understood from an inspection of said Fig. 11 of the drawings. In the present construction, the spanning device is made in the form of a rod, as 69, and the said body-portions 58 of the various clamping devices are provided with suitably disposed holes or perforations 70 in which the horizontally disposed spanning rod 69 is mounted and secured by means of the set-screws 71, as clearly shown in said Figs. 10 and 11 of the drawings.

One means for adjusting the vertical form-posts or uprights 5, after they have been suitably alined so as to be plumb in the manner herein-above described, is illustrated in Figs. 1 to 7 inclusive, said means comprising suitable clamping means, generally designated by the reference-character 72, adapted to be clamped to the uprights or studding 1, and suitable clamping means, generally designated by the reference-character 73, adapted to be clamped to the spanning element or bar 33, the said clamping means being adjustably connected by means of a spacing or tie-rod, as 74.

Each clamping means or device 72 comprises a plate-like body or member 75 adapted to be arranged upon the exposed face-portion 76 of an upright or stud 1, said plate being formed with a right-angled end-portion 77 and a pair of perforated hub-like parts, as 78 and 79, the said parts 78 and 79 extending from certain portions of the plate-like body or member 75 beyond the edges of the face-portion 76 and the opposite sides 80 and 81 of the post or stud 1, as shown more particularly in Fig. 1 of the drawings. Connected with said hub-like part 78 is a pin 82 and slidably mounted upon said pin is the slotted part 84 of a key or wedge, as 83, said wedge being suitably disposed between the side 80 of the post or stud 1 and the said right-angled portion 77 of the body of member 75, substantially as illustrated in Figs. 2 and 6 of the drawings. The said key or wedge 83 may also be provided, if desired, upon its side which engages with the side 80 of the post or stud 1, with a V-shaped or other suitably formed biting rib or member, as 85, the purpose of which will be self-evident from an inspection of said Fig. 6.

Within the perforated hub-like part 79 is a pin 86 upon which is rotatably mounted in a manner as shown, a tightening device in the form of a cam 87 provided with a handle 88 and a marginal and V-shaped biting edge 89 adapted to be forced into the side 81 of the said post or stud 1, so as to positively secure the clamping means or device 72 in its clamped position upon the post or stud 1.

Connected with and extending from the said plate-like body or member 75 is a bracket-like member or extension 90 which, as will be seen from Fig. 7, is formed with a screw-threaded hole 91 into which screwed, so as to be capable of proper adjustment, vertically, as well as rotatably in a horizontal plane, the screw-threaded shank 93 of a pivot post or stem 92, a lock-nut 94 upon the screw-threaded shank 93 being employed for securing said stem in its adjusted position. The upper portion of said stem 92 is preferably flattened, as at 95, said flattened end being formed with a hole or perforation 96 in which is arranged a bolt 97 formed with a head, as 98, and has a tightening nut 100 upon its screw-threaded end-portion 99. Mounted upon said bolt 97, and adjustably secured upon the flat face of the portion 95, by means of the head 98 of the bolt and the nut 100 thereon, is a plate 101 formed at its free end-portion with an angular part 102 having a perforated bearing-member or hub, as 103, in which is mounted the one end-portion of the previously mentioned tie-rod 74, said end-portion of the said rod being secured in its fixed position by means of a set-screw 104, or other suitable fastening means.

As represented in Figs. 1 and 2 of the drawings, the spreader or tie-rods 74 are passed through properly placed holes or perforations 105 in the sheathing 2 and holes or perforations 106 in the form-boards 6, the said rods extending beyond the previously mentioned spanning element 33 and being suitably secured to said spanning element by means of the clamping devices or means 73.

The said devices or means 73 comprise, as will be seen more particularly of an inspection of Figs. 4 and 5 of the drawings, a pair of clamping plates 107 and 108 respectively provided with cut-away portions, as 109 and 110, for fitting said plates upon opposite sides of the rod 74, a set-screw 111 which is screwed into an internally screw-threaded part 112 of the plate 107 being employed for preventing rotary movement of said plates 107 and 108 upon the rod when secured thereon in their clamped positions. To secure said plates in such clamped positions upon the rod 74, the said plates are respectively provided with perforations or holes 113 and 114, in which are arranged suitable tightening bolts 115 provided with binding or tightening nuts 117 which are screwed upon the screw-threaded portions 116 of the said bolts, as shown. The reference-characters 118 and 119 indicate a pair of clamping elements or plates, formed with holes or perforations 120 for mounting said elements or plates upon the rod 74, said plates being provided at their upper edge-portions with retaining lugs or projections 121 and the intervening spaces 122, and at their lower edge-portions the said elements or plates 118 and 119 are provided with the abutting lugs or projections 123. As shown in Figs. 1, 2 and 4 of the drawings, the said embracing elements or plates 118 and 119 are arranged against the opposite edge-portions of the said spanning members 33 with the lugs or projections 121 above said members 33 and the lugs or projections 123 extending beneath the said members 33. For proper adjustment of the said clamping elements or plates 118 and 119 upon the spanning member 33, one of the said plates, as 118, may have an internally screw-threaded socket, as 124, in which is arranged an adjusting screw, as 125, as shown in said Fig. 4 and the manner of operation and purpose of which will be fully understood from an inspection of said Fig. 4. The free end-portion of the rod 74 which projects beyond the clamping plate or element 119 is screw-threaded, as at 126, and arranged upon said screw-threaded portion 126 is a lock-nut 127 of any suitable construction. After proper adjustment of the plates 107 and 108 upon the stretching or tie-rods 74, according to the width of the form that may be desired, the nut 127 is tightened, so as to bring the clamping and embracing elements 118 and 119 into their positively clamped relation with the spanning member 33, the secured and clamped relation of the said various devices and parts thus retaining the vertical posts or uprights 5 in their properly spread relation to the posts or studs 1 and sheathing 2, so that any desired and proper width of the form in which the wall or veneering of concrete, or the like, is to be produced, may be had, as will be clearly evident.

In lieu of the clamping means or devices 72 hereinbefore described, devices 128 such as are illustrated in Figs. 15 and 16 may be employed, such devices comprising a driving stem, as 129, provided, preferably, with a suitably formed head 130, at the one end thereof and at its other end-portion being provided with a suitably formed stop-flange, as 131, and a pointed end 132 for driving the said stem into and fixing it in its operative position upon the face of the upright or stud 1, as shown. Pivotally connected with the said driving stem 129, by means of a bolt or rivet, as 133, is a right-angled member 134 which is formed with a bearing-portion 135 for the mounting therein of the end-portion of the tie-rod 74, the latter being secured in its fixed position in said bearing-portion 135 by means of a set-screw 136, or other suitable fastening means.

Another form of clamping means or device, as 137, which is illustrated in Figs. 17 and 18, may be employed instead of the said devices 72 or 128.

In that case I use a clamp comprising a body-portion 138 provided with a pair of bearing members 139. The said body-portion 138 is also provided with oppositely extending ears or lugs 140, said ears or lugs being arranged in pairs, and each pair of said perforated ears or lugs having a pivot-pin 141 which extends across the space between each pair of said ears or lugs. Pivotally mounted upon each pivot-pin 141, in the space between each pair of said ears or lugs, is a clamping member 142, each member being formed with a biting jaw 143 and a hole or perforation 144.

Mounted in said holes or perforations 144 and extending across the space between the said clamping members 142 is a tightening bolt 145 formed at one end with a head 146 which bears upon the outer face of the one clamping member 142, and at its other end has a screw-thread 147 upon which is mounted a suitably formed tightening means, nut, or the like, as 148, for bringing the device into a positively clamped position upon the upright or stud 1, as will be evident. Suitably held and secured upon the face of the upright, stud, or post 1 by being forced against the face of the upright or post by the bearing members 139 when the clamping members 143 are clamped upon the said post or stud 1, as shown, is a plate 148 formed with a perforated ear or lug, as 149, extending at a right angle therefrom, as shown. Pivotally connected with said ear or lug 149, by means of a suitable bolt, pin, or rivet 150, is a plate-like member or element 151 formed with a pair of rod-receiving bearing-portions 152 and 153 in which the end-portion of the tie-rod 74 is mounted and secured by means of set-screws 154 and 155, or other suitably constructed securing means. This arrangement of two bearing-portions 152 and 153, instead of one bearing-portion 103, shown in Figs. 1, 2, 6, 7 and 14 of the drawings, or of the single bearing-portion 135 of the construction represented in Figs. 15 and 16 of the drawings, prevents any possible distortion or bending of the tie-rods 74 when the clamping means respectively attached to the posts or studs 1 and the spanning elements 33 are adjusted for the proper spreading actions, by means of the devices 34 or 72, of the uprights or posts 5 and other parts connected therewith, when setting up the mold-form of the desired width.

Reinforcement of the wall or veneering 4 may be produced by vertically disposed iron or other suitable rods 154 which are adapted to be held or retained in their vertical positions by means of suitable holding or alining rods or bars 155 formed at one end with eye-portions 156 in which the reinforcing rods 154 are arranged, said rods or bars 155 extending through holes or perforations 157 in the sheathing 2 and being formed with sharp or pointed studs or projections, as 158, which are driven into the sides of the uprights or studs 1, all of which is clearly shown in Figs. 1 and 2 of the drawings, and which are of sufficient length so as to suitably retain the rods or bars 155 and the reinforcing rods 154 in their substantially alined positions in the mold-form and to permit of the pouring of the concrete, or the like, about the said rods without danger of their displacement, as will be clearly understood from an inspection of said Figs. 1 and 2 of the drawings.

From the foregoing description, it will be seen, that I have produced a simple and operative construction of cribbing or mold-form for forming therein a wall, or a veneering upon a finished building, or for producing any other desired structure of concrete or other similar material, the form being capable of adjustment or variation, so as to provide with the same devices and parts, forms of any desired widths. After the wall or veneering has been formed and properly set, the fixing, spanning, adjusting and spreading means or devices are readily brought into their detached relation, and the tie or spreader rods 74 removed. The retaining uprights or other beams, as well as the form-boards are thereupon taken down, and the various openings left by the withdrawal of said rods 74 are suitably plugged or filled with a quantity of concrete, or the like.

Another important and essential feature of this invention is that I have produced a form-section retaining and spacing element, provided with an offset or otherwise constructed retaining member, having a pivotal movement or movements so as to hold said spacing element in various alined relations and at any necessary and desired angle to the form-retaining means or devices, to produce a proper mold-form, and consequently a properly formed wall or veneering.

The many advantages of a cribbing or form for use in concrete construction in producing walls, or in similar work, or for providing the faces of sheathed and other buildings or structures with a suitable veneering of concrete, or the like, are obvious from the foregoing description of the present invention, and need not, therefore, be more fully dwelt upon at this time, except to state that the cribbing or form is easily and quickly erected and readily adjusted. The cribbing or form is just as quickly knocked down or dismantled when the wall, veneering, or other structure has been completed, to be stored away for future use in the erection of another wall, veneering, or other structure.

While in the foregoing description of the invention I have referred to the elements indicated by the reference-character 1, as uprights, posts, or studs, and the part 2 as a stringer or top-member, and the elements 5 as a series of posts or uprights, in generalization I will hereinafter refer to these various parts as form-section retaining elements; and, furthermore, while in the foregoing specification I have referred to the parts 3 as a sheathing or covering, and to the parts 6 as form-boards, for the same purpose, I will hereinafter designate these parts as form-sections.

I am fully aware, that many changes may be made in the general arrangements and combinations of the various devices and parts, as well as in the details of the construction of the said parts, without departing from the scope of the present invention as set forth in the foregoing specification and as defined in the clauses of the claims which are appended to the said specification. Hence, I do not limit my present invention to the exact arrangements and combinations of the several devices and parts as described in the foregoing specification, nor do I confine myself to the exact details of the construction of any of the said parts as illustrated in the accompanying drawings.

I claim:—

1. A knock-down form or cribbing for use in the erection of concrete and similar structures, comprising a series of form-section retaining elements, fixing devices connected with some of said retaining elements, spanning members, retaining clamping means connecting said spanning members with some of said form-section retaining elements, and clamping devices connected with said spanning members and some of said form-section retaining elements for the adjustment of the said elements with relation to the width of the form in which the structure is to be produced.

2. A knock-down form or cribbing for use in the erection of concrete and similar structures, comprising a series of form-section retaining elements, oppositely placed fixing devices connected with some of said retaining elements, tie-rods connected with each pair of oppositely placed fixing devices, spanning members, retaining clamping means connecting said spanning members with some of said form-section retaining elements, oppositely placed clamping devices connected with said spanning members and some of said form-section retaining elements, and a tie-rod connected with each pair of oppositely placed clamping devices for the adjustment of the said form-section retaining elements with relation to the width of the form in which the structure is to be produced.

3. A knock-down form or cribbing for use in the erection of concrete and similar structures, comprising a series of form-section retaining elements, oppositely placed fixing devices connected with some of said retaining elements, tie-rods connected with each pair of oppositely placed fixing devices, one set of said fixing devices comprising a pair of collars or sleeve-like members in which one end-portion of said tie-rod is mounted, a clamping element extending from each collar or sleeve-like member, means connected with said collar or sleeve-like members for securing the same in fixed position upon the inserted end-portion of the said tie-rod, the said end-portion of the tie-rod being also screw-threaded, and an adjusting nut upon said screw-threaded portion of the tie-rod, another set of said fixing devices comprising a pair of plate-like elements provided with embracing members and oppositely disposed rod-receiving perforations, said tie-rod having its other end-portion mounted in one pair of said oppositely disposed perforations and provided with a screw-threaded portion, a pair of clamping plates upon said tie-rod in close juxta-position to one of said plate-like elements, means for securing said clamping plates in place upon said tie-rod, a binding nut screwed upon the screw-threaded end-portion of said tie-rod, a tightening bolt in the other pair of said oppositely disposed perforation of said plate-like elements, and a binding nut upon said tightening bolt, spanning members, retaining clamping means connecting said spanning members and some of said form-section retaining elements, oppositely placed clamping devices connected with said spanning members and some of said form-section retaining elements, and a tie-rod connected with each pair of oppositely placed clamping devices for the adjustment of the said form-section retaining elements with relation to the width of the form in which the structure is to be produced.

4. A knock-down form or cribbing for use in the erection of concrete and similar structures comprising a series of form-section retaining elements, oppositely placed fixing devices connected with some of said retaining elements, tie-rods connected with each pair of fixing devices, spanning members in the form of plate-like pieces, and retaining clamping means connecting said spanning members with some of said form-section retaining elements for lateral bracing of said elements, each retaining clamping means comprising a securing clamp consisting of a body-portion having a screw-threaded hole, a pair of bearing members and perforated ears extending from said body-portion, pivot-pins connected with said ears, a clamping member pivotally connected with each pivot-pin, each clamping member having a biting jaw and a hole, a tightening bolt mounted in the holes of said clamping means, and means on said tightening bolt for bringing said clamping members into clamped relation with a form-section retaining element, a screw-threaded rod screwed into the screw-threaded hole of said body-portion, embracing clamping elements mounted upon said tightening bolt, and means upon said screw-threaded rod for bringing said embracing clamping elements into clamped relation with a spanning member, oppositely placed clamping devices connected with said spanning members and some of said form-section retaining elements, and a tie-rod connected with each pair of oppositely placed clamping devices for the adjustment of the said form-section retaining elements with relation to the width of the form in which the structure is to be produced.

5. A knock-down form or cribbing for use in the erection of concrete and similar structures comprising a series of form-section retaining elements, oppositely placed fixing devices connected with some of said retaining elements, tie-rods connected with each pair of fixing devices, spanning members in the form of plate-like pieces and retaining clamping means connecting said spanning members with some of said form-section retaining elements for lateral bracing of said elements, each retaining clamping means comprising a securing clamp consisting of a body-portion having a screw-threaded hole, a pair of bearing members and perforated ears extending from said body-portion, pivot-pins connected with said ears, a clamping member pivotally connected with each pivot-pin, each clamping member having a biting jaw and a hole, a tightening bolt mounted in the holes of said clamping means, and means on said tightening bolt for bringing said clamping members into clamped relation with a form-section retaining element, a screw-threaded rod screwed into the screw-threaded hole of said body-portion, embracing clamping elements mounted upon said tightening bolt, said embracing clamping elements being provided at their upper edge-portions with retaining lugs and intervening spaces, and at their lower edge-portions with abutting lugs, means upon said screw-threaded rod for bringing said embracing clamping elements into clamped relation with a spanning member, oppositely placed clamping devices connected with said spanning members and some of said form-section retaining elements, and a tie-rod connected with each pair of oppositely placed clamping devices for the adjustment of said form-section retaining elements with relation to the width of the form in which the structure is to be produced.

6. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, means connected with said body for clamping the same in position, a tie-rod-receiving member pivotally connected with relation to said plate-like body, a tie-rod having one of its end-portions adjustably secured to said tie-rod receiving member, the other and oppositely located clamping device comprising a pair of embracing clamping elements mounted upon the opposite end-portion of said tie-rod, and means upon said tie-rod for bringing said embracing clamping elements into clamped relation with a spanning member for the adjustment of said form-section retaining elements with relation to the form in which the structure is to be produced.

7. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, means connected with said body for clamping the same in position, a tie-rod-receiving member pivotally connected with relation to said plate-like body, a tie-rod having one of its end-portions adjustably secured to said tie-rod receiving member, the other and oppositely located clamping device comprising a pair of embracing clamping elements mounted upon the opposite end-portion of said tie-rod, said embracing clamping elements being provided at their upper edge-portions with retaining lugs and intervening spaces, and at their lower edge-portions with abutting lugs, said upper and lower lugs embracing a spanning member, and means upon said tie-rod for bringing said embracing clamping elements into clamped relation with the spanning member for the adjustment of said form-section retaining elements with relation to the form in which the structure is to be produced.

8. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, means connected with said body for clamping the same in position, said plate-like body being provided with an extension, a means of pivotal connection upon said extension, a tie-rod receiving member connected with said means of pivotal connection, a tie-rod having one of its end-portions adjustably secured to said tie-rod receiving member, the other and oppositely located clamping device comprising a pair of embracing clamping elements mounted upon the opposite end-portion of said tie-rod, and means upon said tie-rod for bringing said embracing clamping elements into clamped relation with a spanning member for the adjustment of said form section retaining elements with relation to the form in which the structure is to be produced.

9. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, means connected with said body for clamping the same in position, said plate-like body being provided with an extension, a means of pivotal connection upon said extension, a tie-rod receiving member connected with said means of pivotal connection, a tie-rod having one of its end-portions adjustably secured to said tie-rod receiving member, the other and oppositely located clamping device comprising a pair of embracing clamping elements mounted upon the opposite end-portion of said tie-rod, said embracing clamping elements being provided at their upper edge-portions with retaining lugs and intervening spaces, and at their lower edge-portions with abutting lugs, said upper and lower lugs embracing a spanning member, and means upon said tie-rod for bringing said embracing clamping elements into clamped relation with the spanning member for the adjustment of said form-section retaining elements with relation to the form in which the structure is to be produced.

10. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining element, oppositely placed clamping devices connected with said spanning members and some of said form-section retaining elements, one of said clamping devices consisting of a clamping means comprising a plate-like body, means connected with said body for clamping the same in position, said plate-like body being provided with an extension, a pivot-post rotatably mounted upon said extension, an angular plate pivotally connected with said pivot-post, and a tie-rod receiving bearing hub extending from said angular plate, a tie-rod having one of its end-portions mounted in said hub, means connected with said hub for securing the said tie-rod in its adjusted position in said hub, the other and oppositely located clamping device comprising a pair of embracing clamping elements mounted upon the opposite end-portion of said tie-rod, and means upon said tie-rod for bringing said embracing clamping elements into clamped relation with a spanning member for the adjustment of said form-section retaining elements with relation to the form in which the structure is to be produced.

11. A knock-down form or cribbing for use in the erection of concrete and similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, means connected with said body for clamping the same in position, said plate-like body being provided with an extension, a pivot-post rotatably mounted upon said extension, an angular plate pivotally connected with said pivot-post, and a tie-rod receiving bearing hub extending from said angular plate, a tie-rod having one of its end-portions mounted in said hub, means connected with said hub for securing the said tie-rod in its adjusted position in said hub, the other and oppositely located clamping device comprising a pair of embracing clamping elements mounted upon the opposite end-portion of said tie-rod, said embracing clamping elements being provided at their upper edge-portions with retaining lugs and intervening spaces, and at their lower edge-portions with abutting lugs, said upper and lower lugs embracing a spanning member, and means upon said tie-rod for bringing said embracing clamping elements into clamped relation with the spanning member for the adjustment of said form-section retaining elements with relation to the form in which the structure is to be produced.

12. A knock-down form or cribbing for use in the erection of concrete or similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a means of pivotal connection upon said extension, a tie-rod receiving member connected with said means of pivotal connection, a tie-rod having one of its end-portions adjustably secured to said tie-rod receiving member, the other and oppositely located clamping device comprising a pair of embracing clamping elements mounted upon the opposite end-portion of said tie-rod, and means upon said tie-rod for bringing said embracing clamping elements into clamped relation with a spanning member for the adjustment of said form-section retaining elements with relation to the form in which the structure is to be produced.

13. A knock-down form or cribbing for use in the erection of concrete or similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a means of pivotal connection upon said extension, a tie-rod receiving member connected with said means of pivotal connection, a tie-rod having one of its end-portions adjustably secured to said tie-rod receiving member, the other and oppositely located clamping device comprising a pair of embracing clamping elements mounted upon the opposite end-portion of said tie-rod, said embracing clamping elements being provided at their upper edge-portions with retaining lugs and intervening spaces, and at their lower edge-portions with abutting lugs, said upper and lower lugs embracing a spanning member, and means upon said tie-rod for bringing said embracing clamping elements into clamped relation with the spanning member for the adjustment of said form-section retaining elements with relation to the form in which the structure is to be produced.

14. A knock-down form or cribbing for use in the erection of concrete or similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a pivot-post rotatably mounted upon said extension, an angular plate pivotally connected with said pivot-post, and a tie-rod receiving bearing hub extending from said angular plate, a tie-rod having one of its end-portions mounted in said hub, means connected with said hub for securing the said tie-rod in its adjusted position in said hub, the other and oppositely located clamping device comprising a pair of embracing clamping elements mounted upon the opposite end-portion of said tie-rod, and means upon said tie-rod for bringing said embracing clamping elements into clamped relation with a spanning member for the adjustment of said form-section retaining elements with relation to the form in which the structure is to be produced.

15. A knock-down form or cribbing for use in the erection of concrete or similar structures comprising a series of form-section retaining elements, oppositely placed fixing devices connected with some of said retaining elements, tie-rods connected with each pair of oppositely placed fixing devices, spanning members in the form of plate-like pieces, retaining clamping means connecting said spanning members with some of said form-section retaining elements, oppositely placed clamping devices connected with said spanning members and some of said form-section retaining elements, one of said clamping devices consisting of a clamping means comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a pivot-post rotatably mounted upon said extension, an angular plate pivotally connected with said pivot-post, and a tie-rod receiving bearing hub extending from said angular plate, a tie-rod having one of its end-portions mounted in said hub, means connected with said hub for securing the said tie-rod in its adjusted position in said hub, the other and oppositely located clamping device comprising a pair of embracing clamping elements mounted upon the opposite end-portion of said tie-rod, said embracing clamping elements being provided at their upper edge-portions with retaining lugs and intervening spaces, and at their lower edge-portions with abutting lugs, said upper and lower lugs embracing a spanning member, and means upon said tie-rod for bringing said embracing clamping elements into clamped relation with the spanning member for the adjustment of said form-section retaining elements with relation to the form in which the structure is to be produced.

16. In combination with a member of a knock-down form or cribbing for use in the erection of concrete and similar structures, a fixing means comprising a rod, a pair of plate-like elements mounted upon said rod, embracing members extending from said plate-like elements, a tightening bolt connected with said plate-like elements, and means upon said rod and said bolt for securing said plate-like elements in clamped positions upon the form or cribbing-member.

17. In combination with a retaining member of a knock-down form or cribbing for use in the erection of concrete and similar structures, a spanning member, and retaining clamping means comprising a securing clamp consisting of a body-portion having a screw-threaded hole, a pair of bearing members and perforated ears extending from said body-portion, pivot-pins connected with said ears, a clamping member pivotally connected with each pivot-pin, each clamping member having a biting jaw and a hole, a tightening bolt mounted in the holes of said clamping members, and means on said tightening bolt for bringing said clamping members into clamped relation with the form or cribbing-member, a screw-threaded rod screwed into the screw-threaded hole of said body-portion, and a clamping means mounted upon said screw-threaded rod adapted to be brought into clamped relation with said spanning member.

18. In combination with a retaining member of a knock-down form or cribbing for use in the erection of concrete and similar structures, a spanning member, and retaining clamping means comprising a securing clamp consisting of a body-portion having a screw-threaded hole, a pair of bearing members and perforated ears extending from said body-portion, pivot-pins connected with said ears, a clamping member pivotally connected with each pivot-pin, each clamping member having a biting jaw and a hole, a tightening bolt mounted in the holes of said clamping members, and means on said tightening bolt for bringing said clamping member into clamped relation with the form or cribbing-member, a screw-threaded rod screwed into the screw-threaded hole of said body-portion, a pair of embracing clamping plates adapted to be located upon opposite portions of said spanning member, and means upon said rod for bringing said plates into clamped relation with said spanning member.

19. In combination with a retaining member of a knock-down form or cribbing for use in the erection of concrete and similar structures, a spanning member, and retaining clamping means comprising a securing clamp consisting of a body-portion having a screw-threaded hole, a pair of bearing members and perforated ears extending from said body-portion, pivot-pins connected with said ears, a clamping member pivotally connected with each pivot-pin, each clamping member having a biting jaw and a hole, a tightening bolt mounted in the holes of said clamping members, and means on said tightening bolt for bringing said clamping members into clamped relation with the form or cribbing-member, a screw-threaded rod screwed into the screw-threaded hole of said body-portion, a pair of embracing clamping plates adapted to be located upon opposite portions of said spanning member, said embracing clamping plates being provided at their upper edge-portions with retaining lugs and intervening spaces, and at their lower edge-portions with abutting lugs, and means upon said rod for bringing said clamping plates into clamped relation with said spanning member.

20. In combination with a retaining member of a knock-down form or cribbing for use in the erection of concrete and similar structures, a clamping device, means for clamping said clamping device upon said retaining-member, a rod, and means connected with said clamping device and said rod for securing said rod in angular relation to said retaining member.

21. In combination with a retaining member of a knock-down form or cribbing for use in the erection of concrete and similar structures, a clamping device, means for clamping said clamping device upon said retaining-member, a rod, and means connected with said clamping device and said rod for pivotally connecting said rod with relation to said clamping device and in angular relation to said retaining-member.

22. In combination with a retaining member of a knock-down form or cribbing for use in the erection of concrete and similar structures, a clamping device comprising a plate-like body, means connected with said body for clamping the same upon said retaining-member, said plate-like body being provided with an extension, a means of pivotal connection upon said extension, a rod-receiving member connected with said means of pivotal connection, a rod mounted in said receiving member, and means for securing said rod in a fixed relation to said receiving member.

23. In combination with a retaining member of a knock-down form or cribbing for use in the erection of concrete and similar structures, a clamping device comprising a plate-like body, means connected with said body for clamping the same upon said retaining-member, said plate-like body being provided with an extension, a pivot-post rotatably mounted upon said extension, an angular plate pivotally connected with said pivot-post, a rod-receiving bearing hub extending from said angular plate, a rod mounted in said bearing hub, and means for securing said rod in a fixed relation to said bearing hub.

24. In combination with a retaining member of a knock-down form or cribbing for use in the erection of concrete and similar structures, a clamping device comprising a plate-like body, said body having a right-angled end-portion and a pair of hub-like parts, pins mounted in said hub-like parts, a wedge slidably mounted upon one of said pins, and a tightening cam mounted upon the other pin, a rod, and means connected with said plate-like body for securing said rod in angular relation to the form or cribbing-member.

25. In combination with a retaining member of a knock-down form or cribbing for use in the erection of concrete and similar structures, a clamping device comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a means of pivotal connection upon said extension, a rod-receiving member connected with said means of pivotal connection, a rod mounted in said receiving member, and means for securing said rod in fixed relation to said receiving member.

26. In combination with a retaining member of a knock-down cribbing for use in the erection of concrete and similar structures, a spreading device comprising a plate-like body, said body having a right-angled end-portion and a pair of hub-like parts, pins mounted in said hub-like parts, a wedge slidably mounted upon one of said pins, and a tightening cam mounted upon the other pin, said plate-like body being provided with an extension, a pivot-post rotatably mounted upon said extension, an angular plate pivotally connected with said pivot-post, a rod-receiving bearing hub extending from said angular plate, a rod mounted in said bearing hub, and means for securing said rod in a fixed relation to said bearing hub.

27. In combination with a retaining member of a knock-down form or cribbing for use in the erection of concrete and similar structures, a spanning member, a pair of perforated clamping plates located upon opposite portions of said spanning member, a rod extending through the perforations in said clamping plates, and means upon said rod for bringing said clamping plates into clamped relation with said spanning member.

28. In combination with a retaining member of a knock-down form or cribbing for use in the erection of concrete and similar structures, a spanning member, a pair of perforated clamping plates located upon opposite portions of said spanning member, a rod extending through the perforations in said clamping plates, said clamping plates being provided at their upper edge-portions with retaining lugs and intervening spaces, and at their lower edge-portions with abutting lugs, and means upon said rod for bringing said clamping plates into clamped relation with said spanning member.

29. In combination with a retaining member of a knock-down form or cribbing for use in the erection of concrete and similar structures, a spanning member, a pair of perforated clamping plates located upon opposite portions of said spanning member, a rod extending through the perforations in said clamping plates, said clamping plates being provided at their upper edge-portions with retaining lugs and intervening spaces, and at their lower edge-portions with abutting lugs, means upon said rod for bringing said clamping plates into clamped relation with said spanning member, and means of adjustment connected with one of said abutting lugs and coöperating with the other abutting lug.

30. In combination with a retaining member of a knock-down form or cribbing for use in the erection of concrete and similar structures, a spanning member, a pair of perforated clamping plates located upon opposite portions of said spanning member, a rod extending through the perforations in said clamping plates, said clamping plates being provided at their upper edge-portions with retaining lugs and intervening spaces, and at their lower edge-portions with abutting lugs, means upon said rod for bringing said clamping plates into clamped relation with said spanning member, one of said abutting lugs being provided with a screw-threaded socket, and an adjusting screw in said socket.

31. In combination with a retaining member of a knock-down form or cribbing for use in the erection of concrete and similar structures, a spanning member, a pair of perforated clamping plates located upon opposite portions of said spanning member, a rod extending through the perforations in said clamping plates, means upon said rod for bringing said clamping plates into clamped relation with said spanning member, and a retaining clamp also mounted upon said rod and provided with pivoted clamping members adapted to be brought into clamped relation with said retaining member.

32. In combination with a retaining member of a knock-down form or cribbing for use in the erection of concrete and similar structures, a spanning member, a pair of perforated clamping plates located upon opposite portions of said spanning member, a rod extending through the perforations in said clamping plates, said clamping plates being provided at their upper edge-portions with retaining lugs and intervening spaces, and at their lower edge-portions with abutting lugs, means upon said rod for bringing said clamping plates into clamped relation with said spanning member, and a retaining clamp also mounted upon said rod and provided with pivoted clamping members adapted to be brought into clamped relation with said retaining member.

33. In combination with a retaining member of a knock-down form or cribbing for use in the erection of concrete and similar structures, a spanning member, a pair of perforated clamping plates located upon opposite portions of said spanning member, a rod extending through the perforations in said clamping plates, means upon said rod for bringing said clamping plates into clamped relation with said spanning member, and a retaining clamp comprising a body-portion also mounted upon said rod, clamping members pivotally connected with said body-portion, a tightening bolt connected and coöperating with said clamping members, and a tightening means upon said bolt for bringing said clamping members into clamped relation with said retaining member.

34. In combination with a retaining member of a knock-down form or cribbing for use in the erection of concrete and similar structures, a spanning member, a pair of perforated clamping plates located upon opposite portions of said clamping plates, said clamping plates being provided at their upper edge-portions with retaining lugs and intervening spaces, and at their lower edge-portions with abutting lugs, means upon said rod for bringing said clamping plates into clamped relation with said spanning member, and a retaining clamp comprising a body-portion also mounted upon said rod, clamping members pivotally connected with said body-portion, a tightening bolt connected and coöperating with said clamping members, and a tightening means upon said bolt for bringing said clamping members into clamped relation with said retaining member.

In testimony, that I claim the invention set forth above I have hereunto set my hand this 20th day of January, 1917.

SAMUEL S. COLT.

Witnesses:
FREDK. C. FRAENTZEL,
FREDK. H. W. FRAENTZEL.